Figure 3:
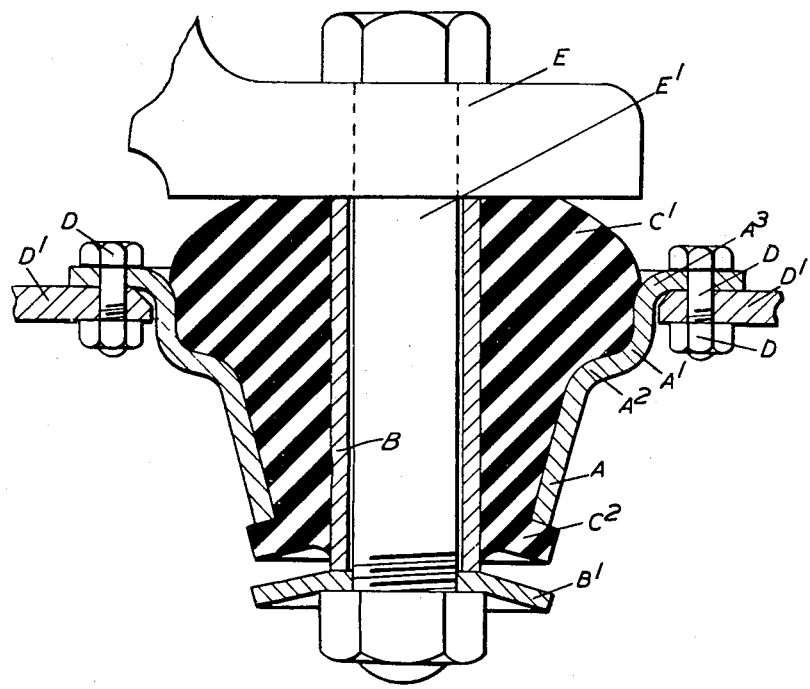

July 17, 1956
P. C. HUTTON
2,755,056
RESILIENT SUPPORTS
Filed Feb. 27, 1953
3 Sheets-Sheet 1
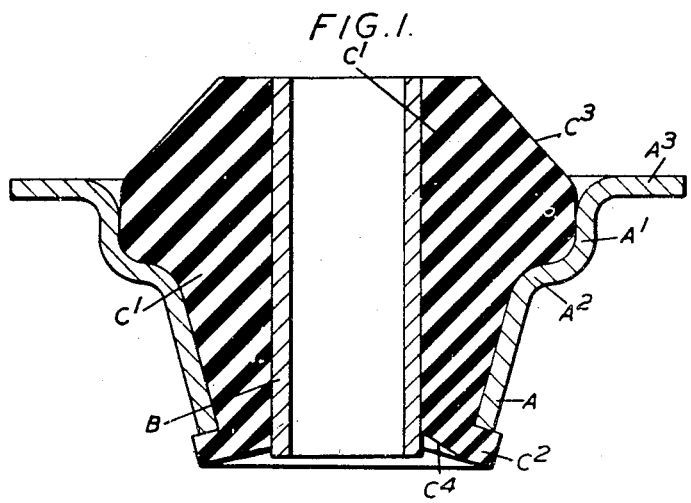
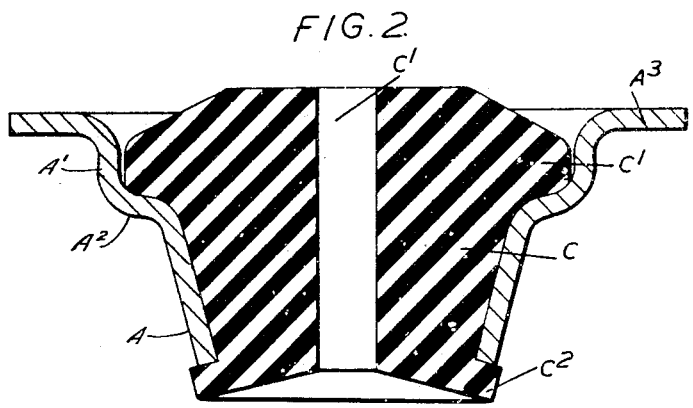
INVENTOR
PHILIP C. HUTTON
BY Holcombe Wetherill & Brumbois
ATTORNEY July 17, 1956 P. C. HUTTON 2,755,056
RESILIENT SUPPORTS
Filed Feb. 27, 1953 3 Sheets-Sheet 2

INVENTOR
PHILIP C. HUTTON

BY
Holcombe Wetherill & Brisebois

ATTORNEY

July 17, 1956   P. C. HUTTON   2,755,056
RESILIENT SUPPORTS

Filed Feb. 27, 1953   3 Sheets-Sheet 3

INVENTOR
PHILIP C. HUTTON.

BY Holcombe Wetherill & Breebois
ATTORNEY

United States Patent Office 2,755,056
Patented July 17, 1956

2,755,056
RESILIENT SUPPORTS

Philip Charles Hutton, London, England, assignor to Silentbloc Limited, London, England, a company of Great Britain Application February 27, 1953, Serial No. 339,360

Claims priority, application Great Britain March 3, 1952

2 Claims. (Cl. 248—358)

This invention relates to resilient supports or mountings of the kind comprising a tubular comparatively rigid outer member, usually formed of metal, an approximately cylindrical comparatively rigid inner member, also usually formed of metal, lying within the outer member and of such external dimensions as to leave an annular space between the inner and outer members, and a bushing of rubber or like resilient material interposed between the inner and outer members so as to lie in the annular space and serving to connect the inner and outer members resiliently to one another.

More particularly, the invention is concerned with improvements in the special forms of resilient supports or mountings of the above general kind which form the subject of United States Patent No. 2,720,374, that is to say in resilient supports or mountings of the kind referred to in which the tubular outer member has a frusto-conical or similarly tapered inner surface, the inner member has an approximately cylindrical outer surface, and the rubber bushing disposed in the annular space between the inner and outer members has a radial thickness in its undistorted state which is greater than the radial dimensions of the space in which it lies, so that the rubber body when in position is radially compressed between the inner and the outer members and, by reason of the frusto-conical or similarly tapered form of the inner surface of the outer member, the rubber is distorted by such radial compression in a manner causing the inner circumferential portions of the bushing as a whole to be displaced bodily in the same axial direction as one another relatively to the outer circumferential portions.

In such a resilient support according to the present invention, the inner circumferential surface of the tubular outer member includes a cylindrical portion extending from the end thereof remote from the smaller diameter end of the frusto-conical or similarly tapered surface and merging into the larger diameter end of that surface.

It will be apparent that the vibration absorbing characteristics will be affected by the presence of the cylindrical portion of the surface referred to and that for any given set of other dimensions of the parts of the mounting, changes in the length of the cylindrical portion of the surface in question, will modify the vibration absorbing characteristics of the mounting.

Moreover according to a further feature of the invention, which may be included in some cases, the engagement between the outer circumferential surface of the rubber bushing and the inner circumferential surface of the tubular outer member may terminate at the larger diameter end of the rubber bushing at a point in the axial length of the cylindrical portion of the inner circumferential surface of the outer tubular member when the mounting is not under load so that with increases in load there will be a tendency for the area of engagement between the rubber bushing and the tubular outer member to move progressively towards the adjacent end of the tubular outer member due to the tendency for the upper end portion of the bushing to bulge as the load is increased.

Alternatively the area of engagement between the rubber bushing and the tubular outer member may extend to the outer end of the cylindrical portion of the surface referred to and in this case the rubber bushing may be provided beyond the outer end of such cylindrical portion with a flange extending radially outwards. Moreover in any case the outer tubular member may be provided at the outer end of the cylindrical portion of the surface referred to with an outwardly extending flange which may serve as a support for the adjacent flange on the rubber bushing when provided.

Figure 4:
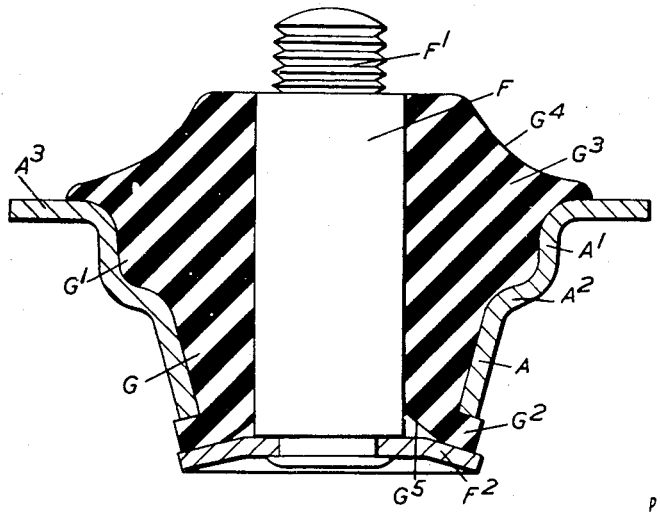
Figure 5:
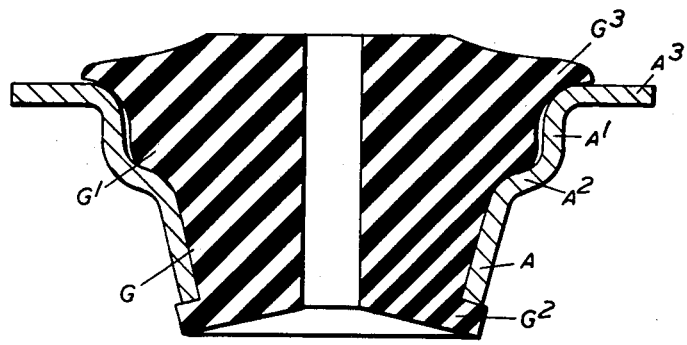
Figure 6:
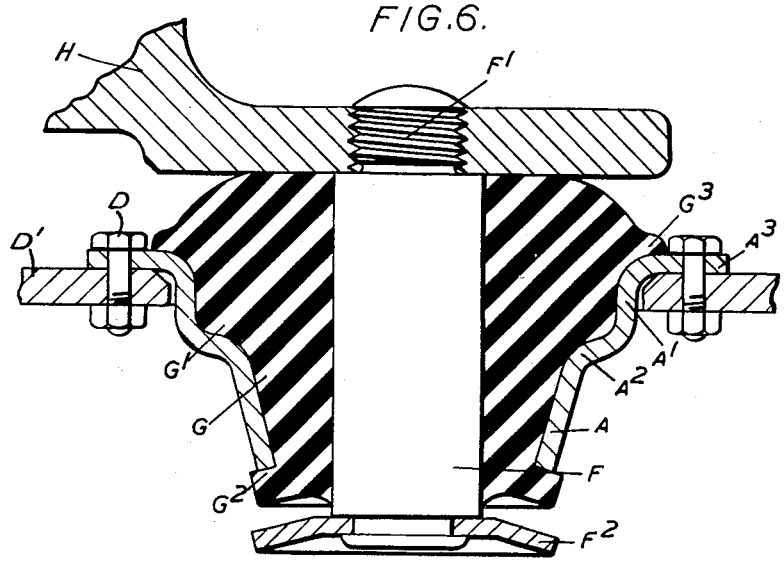

The construction and cross-sectional contour of resilient supports according to the invention may thus vary widely according to requirements but two constructions of flexible resilient support according to the invention are illustrated by way of example in the accompanying drawings, in which Figure 1 is a cross-section through one form of resilient support, according to the invention after assembly and before having a load applied to it, Figure 2 is a cross-section similar to Figure 1 showing an intermediate stage in the manufacture of the resilient support shown in Figure 1, Figure 3 is a similar view to Figure 1 showing the resilient support as it may appear in use when supporting a load, and Figures 4, 5 and 6 are similar views respectively to Figures 1, 2 and 3 of an alternative form of resilient support according to the invention.

In the construction shown in Figure 1 and Figure 3, the support comprises a comparatively rigid outer tubular member of thin-walled section having a lower portion A the inner surface of which is of frusto-conical form and an upper portion $A^1$ the inner surface of which is of approximately cylindrical form, the portions A and $A^1$ merging into one another through an intermediate portion $A^2$, an approximately cylindrical rigid tubular inner member B, and a bushing of rubber or like resilient material C interposed between the inner and outer members, A, $A^1$, $A^2$ and B, so as to lie in the annular space between them and serving to connect these inner and outer members resiliently to one another.

The rubber bushing C in its initial undistorted state is approximately of the form shown at C in Figure 2, that is to say, while its external dimensions conform more or less to the internal dimensions of the outer member $A^1$, $A^2$, A, except for the upper circumferential end portion $C^1$, its bore is of considerably smaller diameter than the external diameter of the inner member B. When, therefore, the inner member B is forced into the bore $C^1$ of the bushing C in a manner known per se after the latter has been inserted into the outer member A, $A^1$, $A^2$ in the manner indicated in Figure 2, the bushing C is considerably radially compressed and the radial compression thus imposed upon it acts, by reason of the frusto-conical nature of the part A, to cause the inner circumferential portions of the bushing as a whole to be displaced upwards relatively to the outer circumferential portions so that in its assembled but unloaded state the bushing takes the form shown in Figure 1. It will be seen incidentally in this figure that the outer circumferential surface of the upper circumferential end portion $C^1$ of the bushing has been forced into close engagement with the part $A^1$ of the outer member as compared with the condition in Figure 2.

As will be seen the outer member A, $A^1$, $A^2$ is provided with a flange $A^3$ at its upper end and, as shown in Figure 3, this flange is provided to enable the outer member to be secured, as by bolts D, to a supporting structure $D^1$ from which a load is to be resiliently supported. Such a load is indicated by the part E, which is secured to the inner member B by a bolt $E^1$ passing through the part E and the inner member B and preferably also securing to the lower end of the inner member B a flange-like abutment member $B^1$ which is arranged to co-operate with a flange-like part $C^2$ on the bushing to limit rebound of the load E. As will be seen the under surface of the part E representing the load bears upon the upper end of the bushing C so as to form in effect an abutment surface for this upper end.

As will be apparent from Figure 3, the upper circumferential end portion $C^1$ of the bushing C tends to expand radially under the effect of the load applied thereto by E so as to increase still further the area of contact between the part $A^1$ of the outer member and the adjacent circumferential portion $C^1$ of the bushing.

In the construction shown in Figures 4, 5 and 6, the resilient support comprises a rigid tubular outer member A, $A^1$, $A^2$, $A^3$ generally similar to the outer member A, $A^1$, $A^2$, $A^3$ of the construction shown in Figures 1, 2 and 3 and for which, therefore, the corresponding parts have been given the same reference letters. In the construction shown in Figures 4, 5 and 6, however, a solid cylindrical inner member F is employed having a screwthreaded portion $F^1$ at its upper end and a rebound flange $F^2$ secured to its lower end.

Moreover the rubber bushing has an initial substantially undistorted form as indicated in Figure 5 and includes a part G having a frusto-conical outer circumferential surface conforming initially to the frusto-conical inner surface of the portion A of the outer member, a part $G^1$ having an approximately cylindrical outer circumferential surface initially of slightly smaller initial diameter than the interior of the portion $A^1$ of the outer member, an external flange $G^2$ at its lower end and an external flange $G^3$ at its upper end extending over part of the upper surface of the flange $A^3$.

As shown in Figure 5 the bore of the rubber bushing G, $G^1$ is initially of substantially smaller diameter than the circumference of the inner member F so that, when this inner member is inserted into such bore, the bushing G, $G^1$ is radially compressed and takes up the form shown in Figure 4, in which, owing to the combined action of radial compression and the conical form of the part A, the inner circumferential portions of the bushing are displaced as a whole axially upwards relatively to the outer circumferential portions of the bushing. It will also be seen that the part $G^1$ of the bushing is expanded into close engagement with the portion $A^1$ of the outer member.

In use the flange $A^3$ is secured to a supporting structure $D^1$ by bolts D as in the construction shown in Figures 1, 2 and 3 while the inner member F is secured to a part H of the load to be carried by screwing the portion $F^1$ into a screwthreaded hole in the part H. Figure 6 shows a typical form which the flexible support shown in Figure 4 may take under load, the exact form depending, it will be understood, on the load being carried in relation to the dimensions of the resilient support and the type of rubber used for the bushing.

It will be seen that in each of the constructions of support shown, when not under load the upper end face of the bushing extends progressively upwards from its inner to its outer circumference as indicated at $C^3$ and $G^4$ respectively, while the end face $C^4$ or $G^5$ at the other end of the bushing similarly extends progressively upwards from its outer to its inner circumference.

In some cases the inner surface of the rubber bushing C, $C^1$ or G, $G^1$ may be bonded to the surface of the inner member B or F or the outer surface of the bushing may be bonded to the member A, $A^1$.

Generally, however, it is preferred not to employ such bonding.

What I claim as my invention and desire to secure by Letters Patent is:

1. A resilient mounting comprising a substantially rigid tubular outer member having an inner surface comprising a generally frusto-conical lower portion with its larger end uppermost, a cylindrical upper portion of substantially larger diameter than the upper end of the frusto-conical portion and an annular shoulder part extending between the upper end of the frusto-conical portion and the cylindrical portion, a substantially rigid externally cylindrical inner member lying within the outer member and of dimensions which leave an annular space between the inner and outer members which is of tapering form where it is bounded circumferentially by the frusto-conical portion of the inner surface of the outer member and of approximately cylindrical form where it is bounded circumferentially by the cylindrical portion of the inner surface of the outer member, and a rubber bushing with a cylindrical bore disposed in the said annular space, said bushing having a flange encircling its upper part shapeable to the interior of the upper part of the outer member, and having its lower part which lies within the frusto-conical surface portion of the outer member of a radial thickness which in its free state is greater than the radial dimensions of the tapered space in which it lies, so that this part of the rubber bushing is radially compressed between the said frusto-conical surface and the cylindrical surface of the inner member with the inner circumferential portions of this part of the bushing as a whole (when not under extraneous load) displaced axially towards the upper portion of the outer member relatively to the adjacent outer circumferential portions, and the upper flange part of the rubber bushing which lies in the cylindrical space above said shoulder is distorted radially to provide a lower annular face which engages against said shoulder of the outer member and an outer cylindrical face which engages said cylindrical surface above said shoulder.

2. A resilient mounting as claimed in claim 1 in which the outer circumferential surface of the upper flange part of the bushing terminates in an inwardly flared top whereby, when the mounting is not under extraneous load, the engagement between said outer circumferential surface of the bushing and the cylindrical portion of the inner surface of the tubular outer member terminates near the upper end of the bushing at a point within the length of said cylindrical portion of the inner surface of the tubular outer member.

References Cited in the file of this patent

FOREIGN PATENTS

| | | |
|---|---|---|
| 637,263 | Great Britain | May 17, 1950 |
| 667,232 | Great Britain | Feb. 27, 1952 |